United States Statutory Invention Registration [19]

Chaoui et al.

[11] Reg. Number: H551

[43] Published: Dec. 6, 1988

[54] OPTICAL PACKAGE WITH IMPROVED FIBER ALIGNMENT FIXTURE

[75] Inventors: Ghazi M. Chaoui; Charles R. Fegley, both of Muhlenberg Township, Berks County; Jan Lipson, Upper Macungie Township, Lehigh County; Ralph S. Moyer, Cumru Township, Berks County; Thomas S. Stakelon, South Whitehall Township, Lehigh County, all of Pa.

[73] Assignees: American Telephone and Telegraph Company, New York, N.Y.; Bell Telephone Laboratories, Incorporated, Murray Hill; AT&T Technologies, Incorporated, Berkeley Heights, both of N.J.

[21] Appl. No.: 62,026

[22] Filed: Jun. 15, 1987

[51] Int. Cl.[4] ..... G02B 6/36; G02B 6/32

[52] U.S. Cl. ..... 350/96.20; 350/96.18; 350/320

[58] Field of Search ..... 350/96.2, 96.21

[56] References Cited

U.S. PATENT DOCUMENTS

| | | | |
|---|---|---|---|
| 4,119,363 | 10/1978 | Camlibel et al. | 350/96.20 |
| 4,144,504 | 3/1979 | Leggett et al. | 331/94.5 |
| 4,296,998 | 10/1981 | Dufft | 350/96.20 |
| 4,523,802 | 6/1985 | Sakaguchi et al. | 350/96.12 |
| 4,623,220 | 11/1986 | Grabbe et al. | 350/96.20 |
| 4,708,429 | 11/1987 | Clark et al. | 350/96.2 |

FOREIGN PATENT DOCUMENTS 2124402A 2/1984 United Kingdom .

*Primary Examiner*—Stephen C. Buczinski
*Assistant Examiner*—Linda J. Wallace
*Attorney, Agent, or Firm*—Wendy W. Koba

[57] ABSTRACT

An optical package includes a two-piece fiber subassembly which allows for separate axial and radial alignment of the fiber to the active optical device. The subassembly consists of an inner ferrule encasing the fiber and an outer sleeve which holds the ferrule. The ferrule is moved axially within the sleeve to perfect the axial alignment of the fiber and the device. The sleeve includes a number of openings around its circumference to expose the ferrule. Once axial alignment is achieved, the outer sleeve is attached to the ferrule through these openings to fix the axial alignment.

17 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL PACKAGE WITH IMPROVED FIBER ALIGNMENT FIXTURE

BACKGROUND OF THE INVENTION

The present invention relates to an optical package with an improved fiber alignment fixture and, more particularly, to a two-piece fiber ferrule which provides simplified axial alignment of the fiber to the active optical device and allows visible inspection of the stability of the fiber axial alignment fixation.

An important factor in the reliability of optical transmission systems is the stability of the various components—transmitters, repeaters, and receivers. The packages housing these components have been the subject of much study, especially the aspect of attaching and aligning the optical fiber to the active component (laser, LED, photodiode, etc.) contained in the package. The stability of these alignments over long periods of time is one of the most important components of the overall system reliability.

This is especially true for laser-based transmitters designed for high frequency, single mode transmission systems, where relatively small lateral movements between the laser and the fiber can result in large coupling losses. For example, a lateral motion of 2 μm can result in a 1 dB coupling loss. Since many of these single mode transmitters are destined for use in remote locations (undersea, for example), the need to maintain precise and accurate alignment is critical.

An exemplary prior art optical package is disclosed in U.S. Pat. No. 4,119,363 issued to I. Camlibel et al on Oct. 10, 1978. In the Camlibel et al arrangement, the optical fiber is inserted in the package through an epoxy-filled tube. Upon solidifying, the epoxy fixes the position of the fiber relative to the tube. To achieve alignment between the fiber and the optical device, the tube is manipulated until maximum optical output is attained. The tube is then soldered into place by heating the entire package. An alternative package arrangement is disclosed in U.S. Pat. No. 4,623,220 issued to D. Grabbe et al on Nov. 18, 1986. Grabbe et al use a fiber alignment pedestal which is located inside the package next to the optical device. The fiber is fed through an epoxy-filled opening in the head of the pedestal and positioned axially to obtain maximum output. The epoxy is then cured to fix this axial alignment. The pedestal itself is located in an epoxy-filled well and is moved vertically and horizontally to maximize output. The epoxy is then cured in the well to maintain the pedestal in place. A problem with both of these arrangements is that the type of epoxy, solder, or other holding material used to fix the alignment must be carefully controlled; for example, materials with different melting temperatures must be used for the two separate alignments of Grabbe et al, so that the fiber and optical device will remain aligned during any further package processing. Additionally, extreme ambient temperature fluctuations during the operation of the device may cause the holding material to soften and thus disrupt the alignment.

As an alternative, U. K. Patent No. 2,124,402A issued to B. A. Eales et al on Feb. 15, 1984 uses laser welding in place of epoxy or solder, to fix the fiber in place. In particular, the optical fiber is encased in a metal tube and positioned on a heat sink next to the optical device. A metal clamp is placed over the fiber to hold it in position and is laser welded to both the heat sink and the metal cover around the fiber. Although the laser welds are more stable than the other forms of attachment previously discussed, the need to perform these laser welds inside the package and within close proximity of the active device may be troublesome.

SUMMARY OF THE INVENTION

The present invention relates to an optical package with an improved fiber alignment fixture and, more particularly, to a two-piece fiber ferrule which provides simplified axial alignment of the fiber to the active optical device and allows visible inspection of the stability of the fiber alignment fixation.

The fiber ferrule of the invention consists of an inner cylindrical tube which houses the fiber and an outer cylindrical sleeve which has an inner diameter slightly greater than the outer diameter of the tube so as to allow the tube freedom of axial movement within the sleeve. The sleeve has at least one hole machined completely through the sidewall to expose the inner tube. Once alignment with the optical device is achieved, the tube and sleeve are joined together through the holes to fix the axial alignment. Laser welds, for example, may be used to form this attachment. This attachment can then be physically inspected to insure that it is satisfactory.

BRIEF DESCRIPTION OF THE DRAWING

Referring now to the drawings, where like numerals represent like parts in several views.

DETAILED DESCRIPTION

Figure 1:
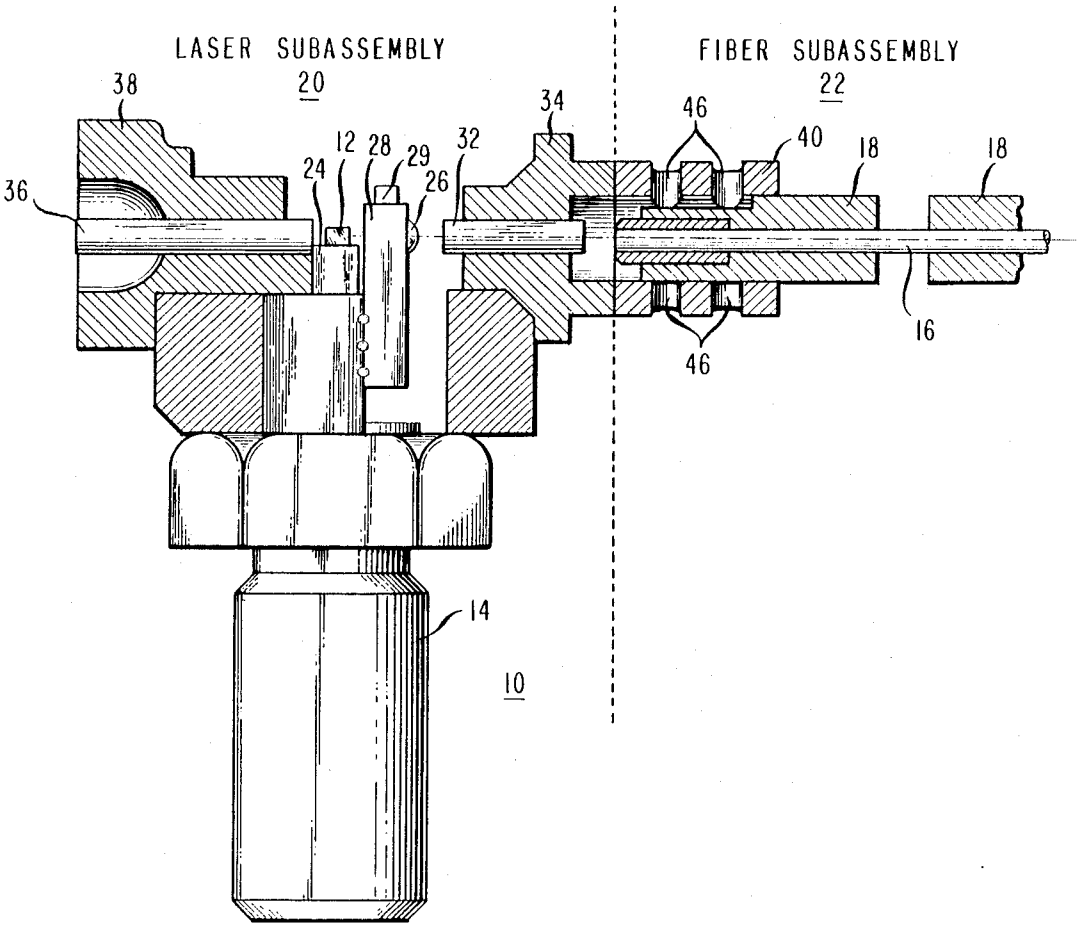
FIG. 1 illustrates a cross-sectional view of an exemplary laser package formed in accordance with the present invention.

FIG. 1 shows a completed package 10 with a laser 12 mounted on a stud 14 and an optical fiber 16 feeding through a ferrule 18 and aligned with laser 12. The package can be considered as comprising two separate subassemblies; a laser subassembly 20 and a fiber subassembly 22. The focus of this invention is primarily related to the axial alignment of these two subassemblies, since the alignment of the two is often critical to the reliability of the final package.

Figure 2:
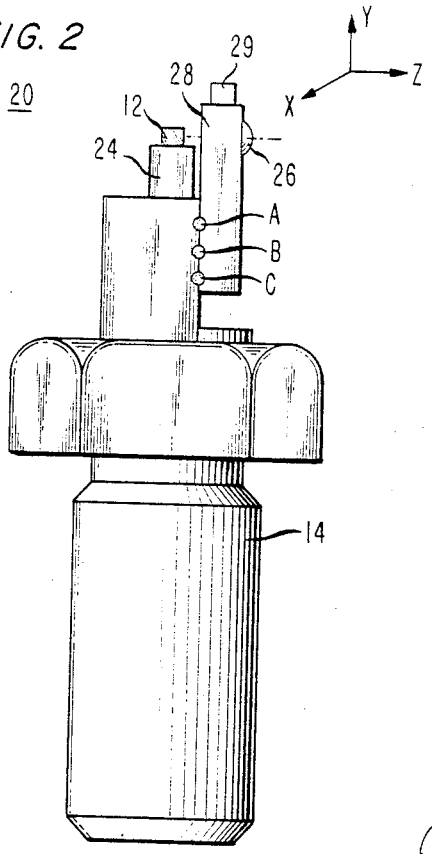
FIG. 2 illustrates an exemplary laser subassembly which may be used in conjunction with the package of FIG. 1.

FIG. 2 illustrates in detail a portion of an exemplary laser subassembly 20. As shown, laser 12 is attached to a mount 24 which is part of stud 14. Since the output from a laser is a divergent beam with a divergent angle in the range of, for example, 10° to 50°, a lens 26 is placed in an opening in a platform 28 using a retaining spring 29, where lens 26 is used to collimate the beam into a more desirable parallel form. Lens 26 is positioned in the z-direction (indicated in the figure) until the required spacing between laser 12 and lens 26 is achieved. In most cases, this spacing should be in the range of 10–20 μm. Active alignment is then performed to position the axis of lens 26 relative to the output from laser 12. In one active alignment procedure, a video system is used where the optical axis of the lens is first aligned with a fiduciary on a video screen. Laser 12 is then activated, and the emission through lens 26 is viewed on the screen at a relatively far distance (>150 mm). The position of platform 28 is then adjusted until the emission aligns with the fiducial marking. Once alignment is achieved, platform 28 is attached to mount section 24 of stud 14. In order to achieve high reliability and insure that the relative positions of laser 12 and lens 26 remain constant, a series of laser welds are used to attach platform 28 to mount 24. Three such laser welds are illustrated at points A, B and C in FIG. 2. A similar set of welds is used to attach the opposite side of platform 28 to mount 24 (now shown).

Referring back to FIG. 1, the remainder of laser subassembly 20 will be described. A first graded-index (GRIN) lens 32 is positioned in front of lens 26 and is used to focus the output from laser 12 to a small spot size. First GRIN lens 32 is held in a first retainer 34 which mates with the housing surrounding laser 12 (shown in FIG. 1). A second GRIN lens 36 is positioned at the rear of laser 12, and is used to focus the output from the rear face of laser 12, where this light output is used to monitor the operation of laser 12. A second retainer 38 is used to hold GRIN lens 36 in place.

Figure 3:
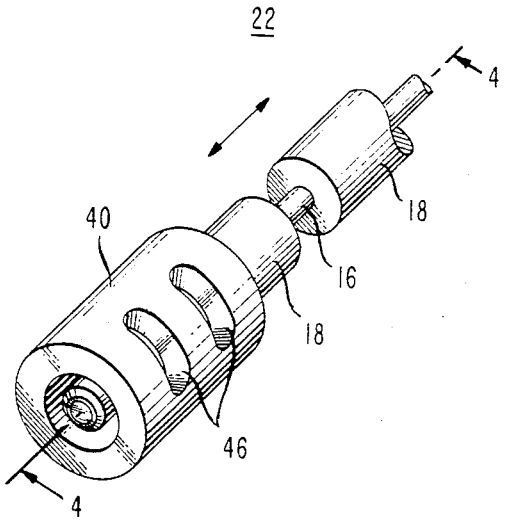
FIG. 3 illustrates an exemplary fiber subassembly which may be used in conjunction with the package of FIG. 1, illustrating in particular the fiber alignment fixture of the invention.
Figure 4:
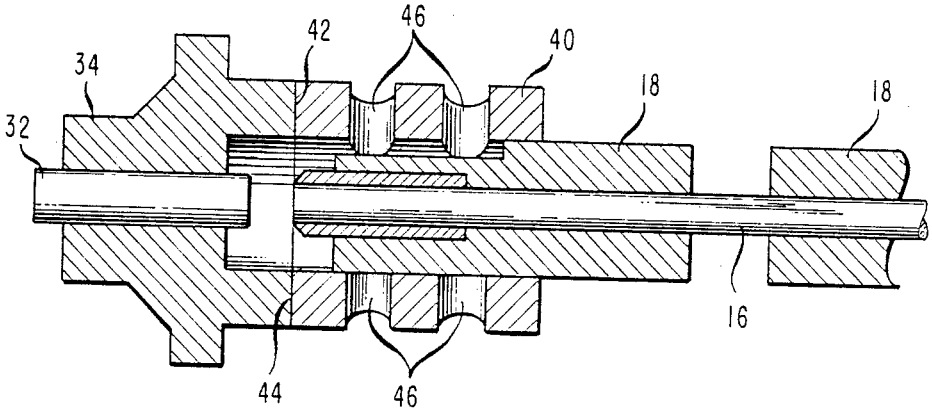
FIG. 4 illustrates another view of the fiber subassembly of FIG. 3, taken along line 4—4 of FIG. 3.

An exemplary fiber subassembly 22 is illustrated in detail in FIG. 3. Ferrule 18, holding fiber 16, is positioned in a z-direction adjustment sleeve 40. FIG. 4 illustrates a section of subassembly 22 taken along line 4–4 of FIG. 3. Fiber ferrule 18 may be axially moved within sleeve 40 (as indicated by the arrows), since the inner diameter (ID) of sleeve 40 is chosen to be slightly greater than the outer diamter (OD) of ferrule 18. It has been found that a gap between the two pieces of 0.001–0.002 inches is sufficient for this purpose. Once the relative positions of ferrule 18 and sleeve 40 are fixed, the attachment is achieved by filling in this gap at a number of locations between the two members, such as by laser welding. During the attachment process, the radial (x,y) position of ferrule 18 within sleeve 40 may shift, due to the induced stresses between the pieces. Thus, as discussed above, it is important that the axial alignment be performed prior to any radial adjustment.

The z-alignment is achieved by bringing face 42 of first GRIN retainer 34 into flush contact with face 44 of z-sleeve 40, as shown in FIG. 4. Laser 12 is then activated and ferrule 18 is moved in the x,y,z direction until the output through fiber 16 is optimized. A series of laser welds, or other suitable form of attachment, is then used to fix the position of ferule 18 in sleeve 40 by filling the gap between ferrule 18 and sleeve 40. This attachment is advantageously performed in the present invention by virtue of the design of z-sleeve 40. As seen by reference to FIGS. 3 and 4, sleeve 40 includes a number of openings, or slots 46, which are machined completely through sleeve 40. Thus, portions of ferrule 18 are visible through openings 46. Laser spot welds may then be performed in the gap through openings 46 to join sleeve 40 to ferrule 18. In this process, a slightly defocused laser beam is used to melt material from ferrule 18 and combine it with melted material from sleeve 40 to fill the gap. Since the locations of these welds are visible, any welds of inferior quality can be seen immediately and redone. This is in contract to some prior art arrangements which used "blind welds" that could not be checked during the welding process.

In one embodiment of the invention, four such openings 46, spaced 90° apart, are formed around the circumference of sleeve 40. This is the arrangement illustrated in FIG. 4. A series of overlapping spot welds, for example, six welds, may be performed in each opening 46 to form a continuous fillet of attachment material in the gap between ferrule 18 and sleeve 40. The symmetry of welds is preferred for stability and the multiplicity is preferred for strength.

At the completion of this welding operation, the radial, or x,y-direction alignment of sleeve 40 to retainer 34 may proceed. Although faces 44 and 42 of retainer 34 and sleeve 40 may be perfectly aligned in the x,y-direction at the completion of the axial alignment process, this is highly unlikely. Thus, some type of radial alignment will be required. In most cases, these two pieces may be formed to comprise the same or nearly the same, outer diameter. This situation is necessary to achieve a reliable radial alignment. In the prior art, a straightforward active alignment, involving the movement of the pieces in the x and y directions until the light output is optimized, was utilized.

An improved x,y alignment process has been developed for use with this laser package, and can in general be used with any radial alignment of two cylindrical pieces having similar outer diameters. Our copending application Ser. No. 061,629 discloses the novel radial alignment procedure which may be employed with this package.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, although the foregoing illustrative embodiment described the packaging of a junction laser, it is apparent, of course, that similar principles apply to packages for other optical sources (such as LEDs) as well as optical detectors (for example, avalanche photodiodes). Additionally, other materials, such as epoxy or solder, may be used to fix the relative positions of the ferrule and sleeve through the openings in the sleeve.

What is claimed is:

1. An optical package comprising:

an optical subassembly including an active optical device located on a mounting structure, and focusing means located between the optical device and the exterior of the package; and a fiber subassembly including an optical fiber encased in a ferrule, the ferrule being located within a cylindrical sleeve and capable of axial motion within said sleeve to achieve optimum axial alignment between the optical subassembly and the fiber subassembly, said sleeve including at least one opening therethrough to expose said ferrule to allow attachment of said ferrule to said sleeve.

2. An optical package as defined in claim 1 wherein laser welds are used to attach the ferrule to the sleeve.

3. An optical package as defined in claim 1 wherein a plurality of openings are formed in the sleeve to allow for a plurality of attachment sites of the ferrule to said sleeve.

4. An optical package as defined in claim 3 wherein laser welds are used in each opening of the plurality of openings to attach the sleeve to the ferrule.

5. An optical package as defined in claim 4 wherein a plurality of laser welds are formed in each opening of the plurality of openings.

6. An optical package as defined in claim 3 wherein a plurality of four symmetrically disposed openings are formed in the sleeve.

7. An optical package as defined in claim 1 wherein the active optical device comprises a semiconductor laser which is positioned on a mount in the optical subassembly.

8. An optical fiber subassembly comprising:

a cylindrical ferrule for encasing an optical fiber; and

A cylindrical outer sleeve surrounding the ferrule, the inner diameter of said sleeve being slightly greater than the outer diameter of said ferrule so as to allow said ferrule the ability to move in an axial direction within said sleeve, said sleeve including at least one opening completely therethrough to expose said ferrule, the ferrule and sleeve being permanently joined through said at least one opening upon achievement of axial alignment of the fiber subassembly with an associated optical device.

9. The optical fiber subassembly of claim 8 wherein laser welds are used to join the sleeve to the ferrule.

10. The optical fiber subassembly of claim 8 wherein a plurality of openings are formed in the sleeve.

11. The optical fiber subassembly of claim 10 wherein a plurality of four, symmetrically disposed openings are formed around the circumference of the sleeve.

12. The optical fiber subassembly of claim 11 wherein a series of laser welds are formed in each opening of the sleeve.

13. The optical fiber subassembly of claim 8 wherein a gap in the range of 0.001–0.002 inches exists between the ferrule and the sleeve.

14. A method of achieving axial alignment between an optical device mounted on a subassembly and a fiber encased in a ferrule surrounded by an outer sleeve member, the sleeve member including at least one opening through its sidewall so as to expose the ferrule, the method including the steps of:

a. activating the optical device b. viewing the output from the optical device through the fiber;

c. moving the ferrule axially within the sleeve until optimum light output is achieved; and d. attaching the ferrule to the sleeve in the optimum position through the at least one opening in the sleeve.

15. The method of claim 14, wherein in performing step (d), laser welding is used to attach the sleeve to the ferrule.

16. The method of claim 14, wherein the sleeve includes a plurality of symmetrically disposed openings such that in performing step (d), a series of attachments are performed in each opening.

17. The method of claim 16 wherein in performing step (d), laser welding is used to form each attachment of the plurality of attachments.

* * * * *